UNITED STATES PATENT OFFICE.

WILHELM KÖNIG, OF OHRDRUF, GERMANY, ASSIGNOR TO KARL MERZ, OF FRANKFORT-ON-THE-MAIN, GERMANY.

MONOAZO DYE AND PROCESS OF MAKING SAME.

No. 908,580.  Specification of Letters Patent.  Patented Jan. 5, 1909.

Application filed July 30, 1908. Serial No. 446,081.

*To all whom it may concern:*

Be it known that I, WILHELM KÖNIG, doctor of philosophy, chemist, a subject of the Emperor of Germany, residing at Ohrdruf, in the Duchy of Saxe-Coburg-Gotha, have invented new and useful Improvements in the Production of Monoazo Dyestuffs Specially Valuable for Preparing Blue-Red Pigment Colors, of which the following is a specification.

In the face of the combination-products of other known 2-naphthylamin-sulfo acids with 2-naphthol-3-carbon acid I have found that the combination-dyestuff naphthalene-8-sulfo acid-2-azo-2-naphthol-3-carbon acid is most valuable for preparing pigment colors in form of their metal salts specially alkaline earth salts, a fact which never could be foreseen. Remarkably valuable in this respect and a characteristic feature of this dyestuff is the barium-salt giving a clear blue-red color of great fire and trueness whereas the barium-salts of all other dyestuffs of the 2-naphthylamin-sulfo acids are of dull nuances, of less trueness and are therefore not suitable to be used as pigment colors. Also the calcium-salt of the new combination-dyestuff gives a clear bordeaux of very bright nuance and surpasses in its trueness in a high manner the calcium-salt of the combination-product of 2-naphthylamin-1-sulfo acid with 2-naphthol-3-carbon acid which product gives a less clear and brownish dyestuff and the calcium-salt of the combination-product of 2-naphthylamin-5-sulfo acid with 2-naphthol-3-carbon acid which is of a deeper blue but duller whereas the calcium-salts of the combination-products of 2-naphthylamin-6-sulfo acid and 2-naphthylamin-7-sulfo acid are totally discolored.

From the foregoing results that the valuable pigment-colors before described may only be obtained with a 2-naphthylamin-8-sulfo acid dyestuff totally free from any other 2-naphthylamin-sulfo acid dyestuff.

The following example will serve to explain the method of carrying out the invention:—

Example: 22.3 kilos of 2-naphthylamin-8-sulfo acid are diazotized in a suitable manner and the diazo acid obtained in suspension is then run into a solution of 18.8 kilos of 2-naphthol-3-carbon acid always kept alkaline. The dyestuff then separates as sodium-salt and this sodium-salt may then be transformed into any other suitable metal-salt which may advantageously be employed as a pigment-color either by itself without a base or with one of the usual bases. Of course the process may also be carried out in such a manner that in coupling the diazotized 2-naphthylamin-8-sulfo acid with 2.3-oxynaphthoic acid the dyestuff is obtained at once as barium or calcium-salt or any other metal-salt.

The sodium-salt of the dyestuff is a red paste or powder soluble in water to a red solution and soluble in concentrated sulfuric acid to a blue-red solution from which on addition of water the red-brown free acid of the dyestuff is precipitated which represents in form of its other metal-salts (Ba-, Ca-, Pb-salts or others) blue-red powders which may be employed either by themselves without a base or with one of the usual bases suitable for producing pigment-colors of great trueness and totally insoluble in water, oil and alcohol.

Having thus described my invention, what I claim and desire to secure by Letters Patent, is—

1. The herein described process of producing a monoazo-dyestuff specially valuable for preparing blue-red pigment colors, consisting in the combination of the diazotized 2-naphthylamin-8-sulfo acid with 2.3-oxynaphthoic acid.

2. As a new article of manufacture the dyestuff obtained by the combination of the diazotized 2-naphthylamin-8-sulfo acid with 2.3-oxynaphthoic acid and representing in form of its sodium salts a red paste or powder soluble in water to a red solution, soluble in concentrated sulfuric acid to a blue-red solution from which on addition of water the red brown free acid of the dyestuff is precipitated and which represents in form of its other metal salts (Ba-, Ca-, Pb-salts) blue-red powders suitable to be employed either by themselves without a base or with one of the usual bases for the production of pigment colors distinguished by great trueness and total insolubility in water, oil and alcohol.

In testimony whereof I affix my signature in presence of two witnesses.

WILHELM KÖNIG.

Witnesses:
GUSTAV LAUTER, Jr.,
FR. STENGEL.